US010846138B2

(12) United States Patent
Wang et al.

(10) Patent No.: US 10,846,138 B2
(45) Date of Patent: Nov. 24, 2020

(54) ALLOCATING RESOURCES OF A MEMORY FABRIC

(71) Applicant: HEWLETT PACKARD ENTERPRISE DEVELOPMENT LP, Houston, TX (US)

(72) Inventors: Zhikui Wang, Fremont, CA (US); Antonio Lain, Menlo Park, CA (US); Sai Rahul Chalamalasetti, Palo Alto, CA (US); Anshuman Goswami, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 107 days.

(21) Appl. No.: 16/110,516

(22) Filed: Aug. 23, 2018

(65) Prior Publication Data

US 2020/0065150 A1 Feb. 27, 2020

(51) Int. Cl.
*G06F 9/50* (2006.01)
*G06F 9/48* (2006.01)
*G06F 3/06* (2006.01)
*G06F 9/54* (2006.01)

(52) U.S. Cl.
CPC .......... *G06F 9/5016* (2013.01); *G06F 3/0604* (2013.01); *G06F 3/067* (2013.01); *G06F 3/0631* (2013.01); *G06F 9/4881* (2013.01); *G06F 9/5038* (2013.01); *G06F 9/544* (2013.01)

(58) Field of Classification Search
CPC .................................................... G06F 9/5016
See application file for complete search history.

(56) References Cited

U.S. PATENT DOCUMENTS

| 6,006,270 | A  | * | 12/1999 | Kobunaya | .......... | H04Q 11/0478 |
| | | | | | | 370/231 |
| 9,330,433 | B2 | | 5/2016 | Koker et al. | | |
| 10,068,183 | B1 | * | 9/2018 | van Rooyen | ...... | G06K 9/00986 |
| 10,360,092 | B1 | * | 7/2019 | Ayoub | .................. | G06F 11/261 |
| 2011/0078382 | A1 | * | 3/2011 | Bernstein | ............ | G06F 12/0864 |
| | | | | | | 711/128 |

(Continued)

FOREIGN PATENT DOCUMENTS

CN 102650950 8/2012

OTHER PUBLICATIONS

Kim, G. et al.; "Multi-GPU System Design with Memory Networks"; 2014; 12 pages.

(Continued)

*Primary Examiner* — Charlie Sun
(74) *Attorney, Agent, or Firm* — Nolte Intellectual Property Law Group (57) ABSTRACT

A method for allocating resources includes determining that an initial allocation of memory bandwidth for one or more computing jobs fails a performance metric. The memory bandwidth provides access to a global memory pool for multiple legacy processors across a memory fabric. The method also includes determining a new allocation of memory bandwidth for the computing jobs that meets the performance metric. Additionally, the method includes assigning the new allocation of memory bandwidth to the computing jobs. The method further includes executing the computing jobs using the new allocation of memory bandwidth.

19 Claims, 5 Drawing Sheets

(56) References Cited

U.S. PATENT DOCUMENTS

2014/0195743 A1* 7/2014 Fleischer ............ G06F 13/1663
711/151
2018/0176295 A1* 6/2018 Flavel ................. H04L 61/1511

OTHER PUBLICATIONS

Morgan, T. P., "Nvidia Memory Switch Welds Together Massive Virtual GPU"; Mar. 27, 2018; 4 pages.

Mujtaba, H.; "AMD Talks Next Generation Coherent Interconnect Fabric Connecting Polaris GPUs, Zen CPUs and HPC APUs"; Jan. 16, 2016; 7 pages.

* cited by examiner

ALLOCATING RESOURCES OF A MEMORY FABRIC

BACKGROUND

Interconnects are the physical connections between computer processors and the peripheral components of a computer, such as memory and disk drives. Interconnects provide the communication channels that enable computer processors to direct the operation of these peripheral components. The peripheral component interconnect express (PCIe) is an example interconnect used in many computers. However, the PCIe puts limits on how memory can be used, thus introducing inefficiencies that limit how quickly computer processors can process data.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

A memory fabric makes it possible to increase the rate at which computer processors can read and write data, in comparison to the PCIe. Memory fabrics may be useful in multi-processor computer systems, such as the systems in datacenters that are used for applications like cloud computing and artificial intelligence. However, multi-processor computer systems may have processors with PCIe interfaces that prevent these processors from being able to exploit some of the advantages of a memory fabric, such as access to a larger amount of memory attached to the memory fabric, and the ability to move data over a memory fabric with lower latency than that of the PCIe.

Accordingly, examples described herein address the challenges of memory fabrics by allocating memory bandwidth to computing jobs running on these multi-processor systems that is based on the computing jobs' use of memory. A computing job is a term that refers to the complete execution of a software application. Memory bandwidth is the rate at which a computer processor reads from and writes to memory. Additionally, examples described herein may offload certain computer operations from legacy processors with PCIe technology to a memory appliance that has high-speed connections to the memory fabric.

Figure 1:
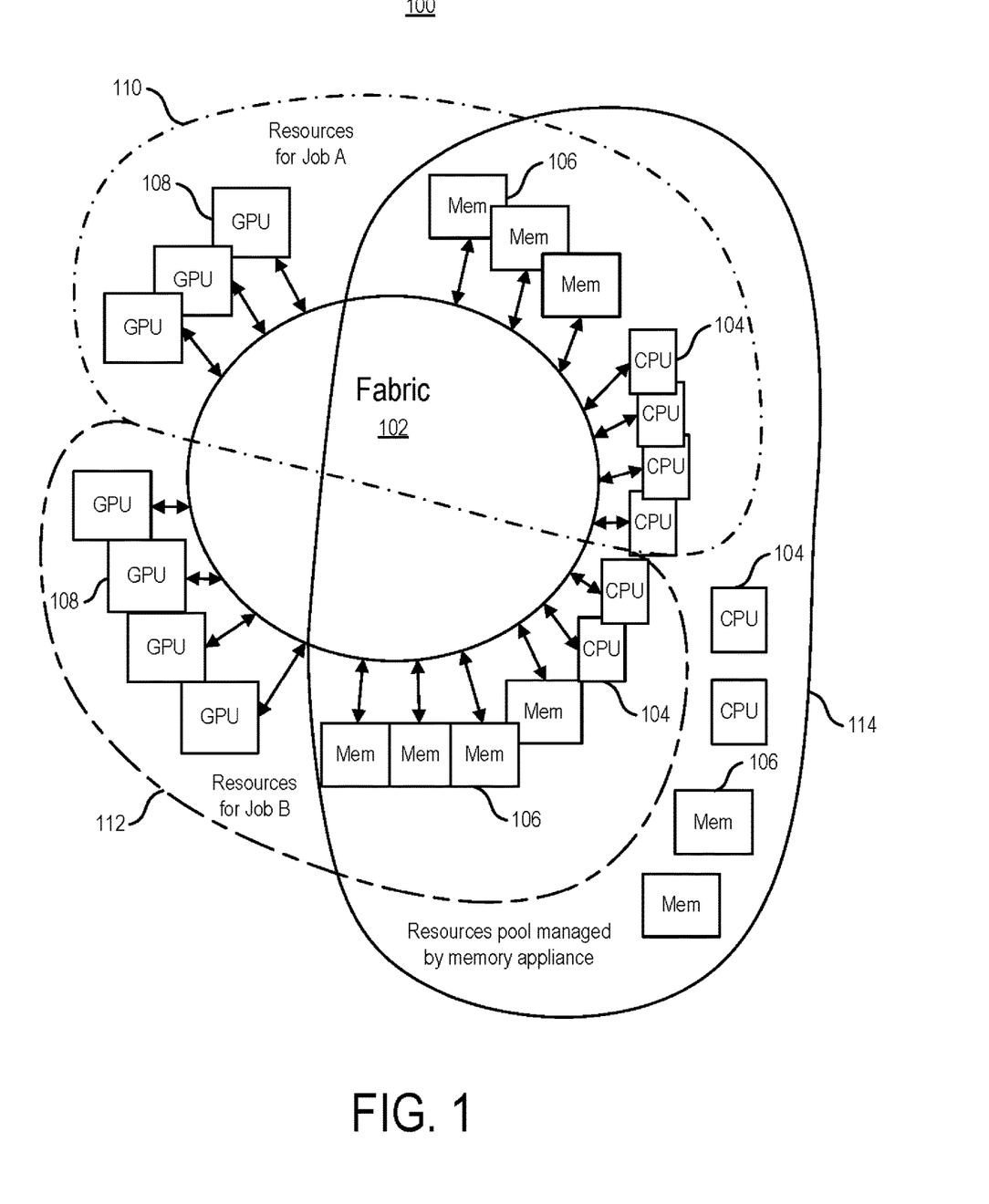
FIG. 1 is an example multi-processor computer system that allocates resources of a memory fabric.

FIG. 1 is an example multi-processor computer system 100 that allocates resources for a memory fabric 102. Multi-processor systems, such as the system 100 may be used to run multiple computing jobs simultaneously. The system 100 includes multiple resources attached to the memory fabric 102 that may be used by the computing jobs. For example, the system 100 includes the memory fabric 102, the central processing units (CPUs) 104, units of memory 106, and graphical processing units (GPUs) 108. A CPU is a general-purpose computer processor that may execute the instructions of a computing job. A GPU is a type of computer processor that may be referred to as a hardware accelerator. Hardware accelerators may be configured to perform specific types of operations more efficiently than a general-purpose CPU. For example, GPUs were originally developed to perform computer operations specific to image processing. GPUs are thus useful for reducing the processing times of software that produces graphics, such as video games. However, GPUs have proven to be useful in other applications, such as in the field of artificial intelligence.

To enable multiple computing jobs to run at the same time on multi-processor systems, such as the system 100, each computing job may be allocated some portion of the system's resources, e.g., memory bandwidth on the memory fabric 102, processors, such as CPUs 104 and GPUs 108, and memory 106. In some cases, the allocation is called a partition. For example, the system 100 includes partition 112 and partition 114, which may represent allocations of resources to two different computing jobs, computing job A and computing job B, respectively. Additionally, the system 100 may include a resource pool 116. In examples, the resource pool 116 represents the resources used by a memory appliance (not shown). The memory appliance may be software running on the system 100 that performs operations on behalf of computing jobs A and B. When performing operations on behalf of a computing job, the memory appliance uses the resources in the resource pool 116 that are allocated to that computing job. For example, when performing an operation on behalf of computing job A, the memory appliance may use a CPU 104 and memory 106 allocated to computing job A, i.e., in the resource pool 116 and the partition 112. The memory appliance is described in greater detail with respect to FIG. 2.

Referring to FIG. 1, in comparison to legacy interconnects, such as the PCIe, the memory fabric 102 may provide high-bandwidth and low-latency access to the memory 106. Additionally, the memory fabric 102 may provide direct access between CPUs 104 and between GPUs 108. In examples, the memory fabric 102 may also be treated as a resource to be allocated, specifically the memory bandwidth of the memory fabric 102. More specifically, portions of the available memory bandwidth across the memory fabric 102 may be allocated to each computing job running on the system 100. In some examples, the memory bandwidth may be statically allocated, meaning the memory bandwidth for a computing job is set at the beginning of the computing job, and remains the same throughout the computing job's execution. The amount of memory bandwidth that is statically allocated may be based on a predetermined estimate of the computing job's memory accesses. For example, a computing job with relatively high rates of memory accesses may be allocated 50 gigabytes of memory bandwidth per second. In contrast, a computing job with relatively lower rates of memory accesses may only be allocated 5 gigabytes of memory bandwidth per second. However, if a computing job's actual memory use varies from the estimate, the efficiency of the computing job's execution may suffer. In other words, if a computing job is not allocated enough memory bandwidth, this may prolong the execution time of a computing job. Conversely, over-allocating memory bandwidth to one computing job may cause another computing job to be deficient in memory bandwidth. Accordingly, in an example, the memory bandwidth for a computing job may be allocated dynamically, meaning the amount of memory bandwidth initially allocated to a computing job may be increased or decreased based on how the computing job accesses memory during execution.

Figure 2:
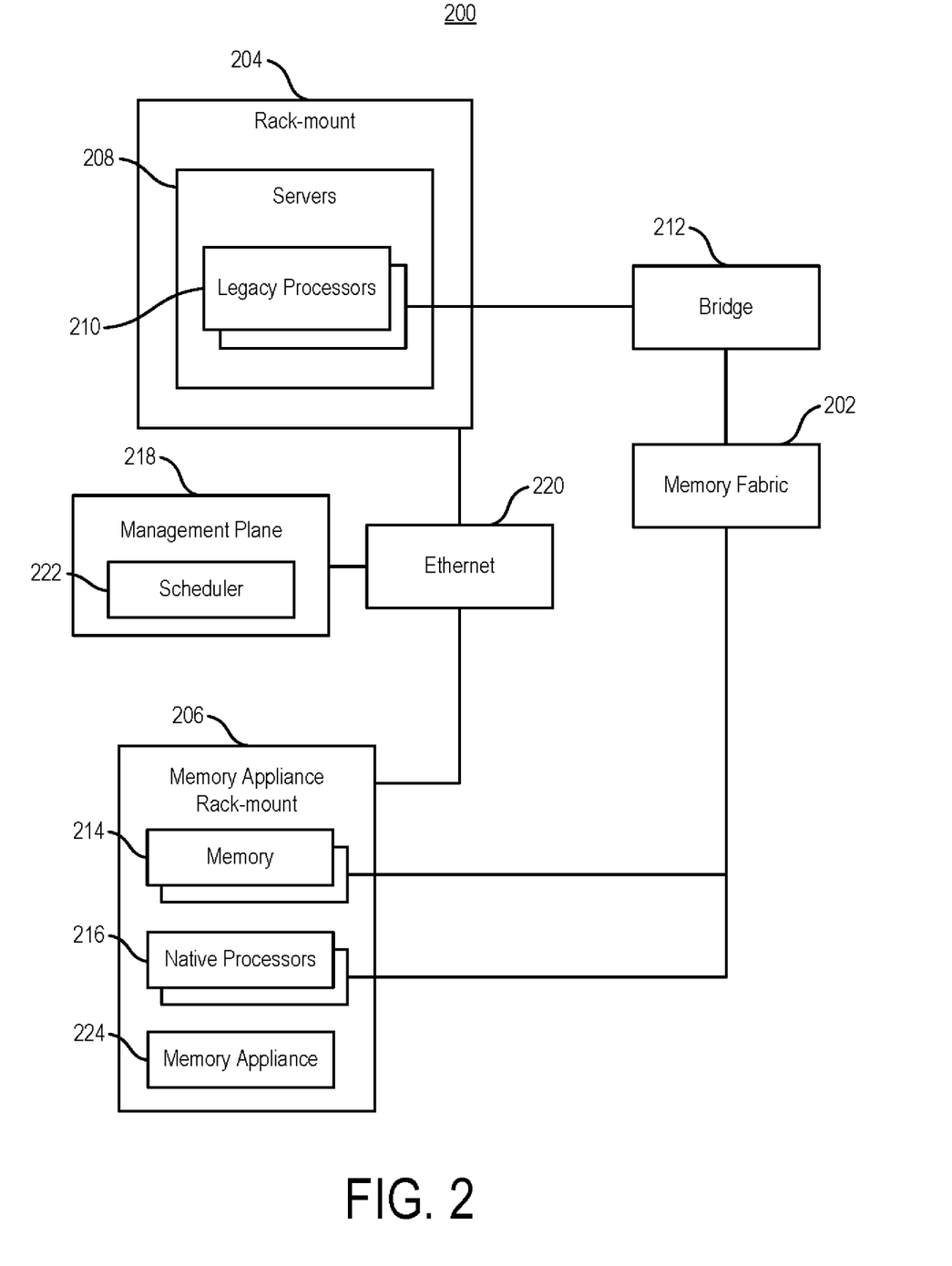
FIG. 2 is an example datacenter that allocates resources of a memory fabric.

FIG. 2 is an example datacenter 200 that allocates resources for a memory fabric 202. The datacenter 200 is a computer processing facility that may house a number of computers in cabinets of rack-mounts that economize the amount of space the computers occupy. The example datacenter 200 includes rack-mount 204 and memory appliance rack-mount 206, which house the processing components for executing computing jobs in the datacenter 200. The rack-mounts 204, 206 are racks that are configured to hold multiple computer components. The computer components may be mounted onto the rack-mounts 204, 206 with screws. The rack-mount 204 includes multiple servers 208, each of which may be a single computer architecture. In examples, the servers 208 include multiple legacy processors 210. The legacy processors 210 may be computer processors or accelerators, such as CPUs and GPUs. The word, legacy, refers to the inclusion of older technology. Thus, the interconnect interfaces of the legacy processors 210 may not be configured for direct connection to the memory fabric 202. Rather, the legacy processors 210 may include interfaces to a legacy interconnect, such as the PCIe. Accordingly, the legacy processors 210 may be connected to the memory fabric 202 over a bridge 212. The bridge 212 may be computer hardware that provides an interface between the PCIe connection on the legacy processors 210 and the memory fabric 202.

The memory appliance rack-mount 206 may include units of memory 214, native processors 216, and a memory appliance 224. The memory 214 is connected to the memory fabric 202 and may provide a global pool of memory that is accessible from the legacy processors 210 and the native processors 216. The native processors 216 are also connected to the memory fabric 202, and may be computer processors, such as CPUs. The word, native, refers to the inclusion of compatible technology. Thus, in this context, the native processors 216, may include interconnect interfaces that are compatible with the memory fabric 202. As such, the native processors 216 may be able to access memory 214 over the memory fabric 202 with higher bandwidth and lower latency than the legacy processors 210. In one example, the native processors 216 may be systems on a chip (SoCs). A SoC may be a single computer processing chip that combines the electronic circuits of multiple computer components to perform specific tasks.

The datacenter 200 also includes a management plane 218, which may be a computing system used to manage the resources of the datacenter 200. The management plane 218 may be connected to the rack-mount 204 and memory appliance rack-mount 206 over an Ethernet 220. The Ethernet 220 may be a communication network with a physical cable connecting the rack-mount 204 and the memory appliance rack-mount 206 to the management plane 218. The management plane 218 may be used to configure the resources that make it possible to run computing jobs in the datacenter 200. More specifically, the management plane 218 may include a scheduler 222 that allocates these resources. Additionally, the scheduler 222 may be software that allocates specific legacy processors 210, memory 214, and native processors 216 to each computing job, statically or dynamically. In examples, the scheduler 222 may allocate memory bandwidth across the memory fabric 202 to each computing job. More specifically, for computing jobs that are stalling while waiting for access to the memory 214, the scheduler 222 may increase the allocation of memory bandwidth to the legacy processors 210 for those jobs.

The memory appliance rack-mount 206 may also include a memory appliance 224, which may be software that offloads data movement operations from the legacy processors to the native processors 216. Data movement operations may be computer instructions that include data shuffles and data exchanges. Further, data movement operations are part of a larger group of computing operations referred to herein as collective memory operations. Collective memory operations are computer operations that may be performed on groups of data. Thus, in addition to data movement, collective memory operations may include operations on groups, such as aggregations. Because the connections from the native processors 216 to the memory fabric 202 may have higher bandwidth and lower latency than the connections from the legacy processors 210 to the memory fabric 202, the legacy processors 210 may not be able to perform collective memory operations as quickly as the native processors 216. Accordingly, collective memory operations may be offloaded from the legacy processors 210 to the native processors 216 by the memory appliance 224. More specifically, the memory appliance 224 may use the native processors 216 allocated to a computing job to perform collective memory operations on behalf of the computing job.

In one example, the memory appliance 224 may be a virtual machine that serves collective memory operation requests from the computing jobs running in the datacenter 200. In this context, to serve a collective memory operation request means that the memory appliance 224 directs a native processor 216 to perform the collective memory operation in response to a request from the computing job. In other examples, the memory appliance 224 may represent an application programming interface (API), with which commands directing native processors 216 to perform collective memory operations may be invoked. Additionally, the memory appliance 224 may improve the efficiency of the collective memory operations through running a memory copy by parallelizing execution. Running a memory copy by parallelizing execution means executing the computing job on multiple processors. When parallelizing execution, each processor may be responsible for processing different parts of the data. In this way, the computing job may be run in parallel.

Additionally, the offloading of collective memory operations may also provide parallelism to the computing job. In the memory appliance 224, the native processors 216 may perform the collective memory operations in parallel with the operations performed by the legacy processors 210. In this way, the operations of the legacy processors 210 and the native processors 216 may overlap. The greater the amount of overlap during computing job execution, the greater the processing efficiency of the computing job and the datacenter 200. The reason the efficiency is greater with greater overlap is because there may be no processor stalling during overlap. A processor stall means that the stalled processor, e.g., the legacy processor 210, has a dependency on another processor, the native processor 216, and the stalled processor must waste time waiting for the other processor to finish its operation before the stalled processor can proceed. Examples enable multi-processor systems, such as datacenter 200 to increase efficiency by reducing processor stalling. Further, offloading collective memory operations to the native processors 216 may free up the legacy processors 210 to perform other operations. Additionally, the legacy processors 210 may be freed up to work on other computing jobs.

In examples, the memory appliance 224 may also increase efficiency by aggregating data. Aggregating data means that the memory appliance 224 may wait to perform a collective memory operation until a larger set of data is available for the collective memory operation. In such examples, waiting for the larger set of data may be more efficient than performing the operation twice: once before the larger data set is available, and once after the larger data set is available. In this way, examples may increase the granularity of collective memory operations, making the collective memory operations more coarse-grained, meaning more data is operated on with each collective memory operation. This type of wait may be considered analogous to piggy-backing in network communications where limiting the number of communications is useful. Piggy-backing refers to the practice of waiting to acknowledge a communication with a response until there is data to send with the acknowledgment, thus saving the expense of two communications.

In examples, the scheduler 222 may increase the number of native processors 216 that are allocated to a computing job to improve the computing job's performance. In this way, the amount of time it takes to complete collective memory operations may be reduced. Accordingly, in examples, the number of native processors 216 that the scheduler 222 allocates to a computing job may be based on the number of collective memory operations performed by the computing job. Additionally, offloading collective memory operations to the native processors 216 may reduce the number of operations performed by the legacy processors 210 allocated to a computing job. Thus, this offloading may result in a reduction in the number of legacy processors 210 used by the computing job. Further, the reduction in the number of legacy processors 210 used by the computing jobs may free up processing power, thus enabling the datacenter 200 to increase the number of computing jobs that the datacenter 200 may host. Also, like the memory bandwidth allocation, the scheduler 222 may allocate the native processors 216 to computing jobs statically or dynamically.

Figure 3:
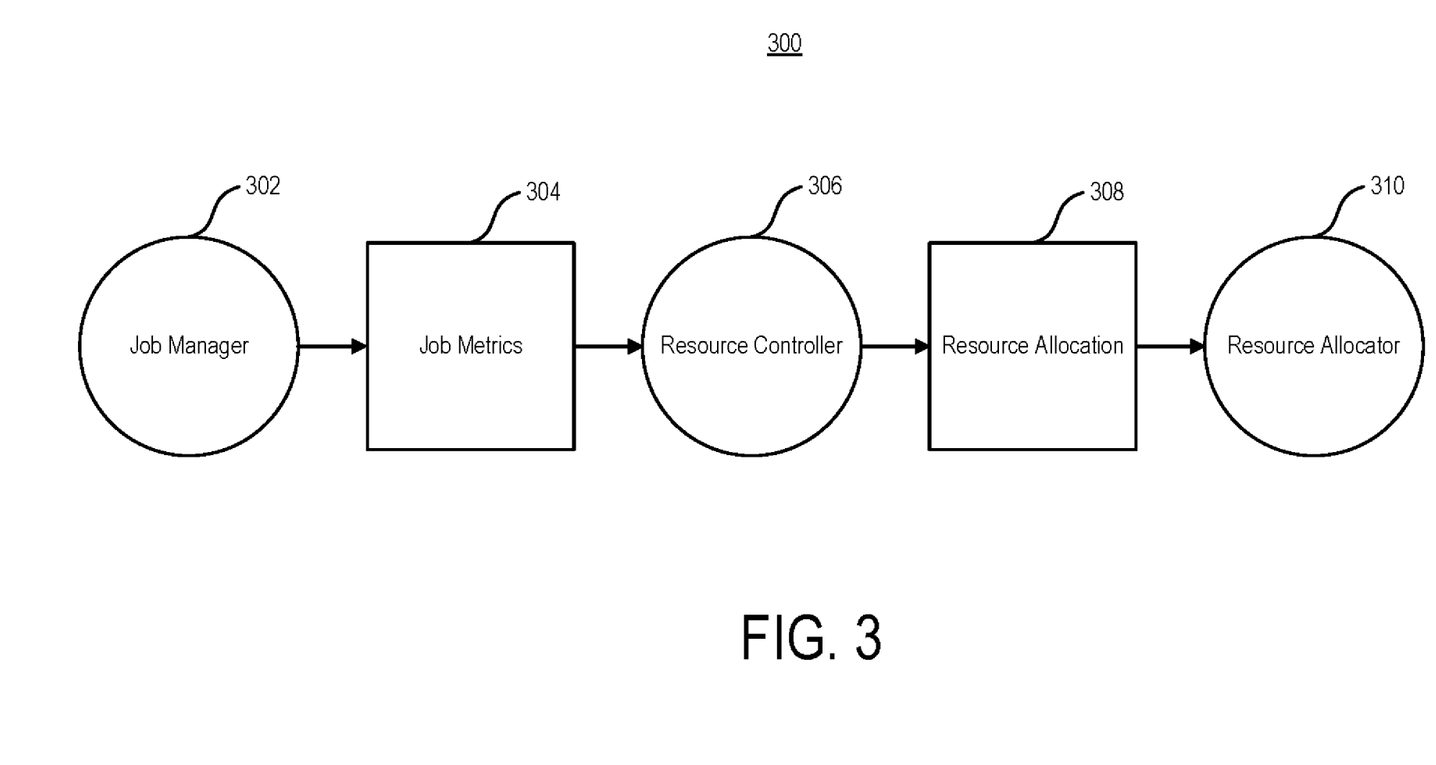
FIG. 3 is an example data flow for dynamically allocating resources of a memory fabric.

FIG. 3 is an example data flow 300 for dynamically allocating resources of a memory fabric. In examples, dynamic allocation of resources may be performed both in real-time and batch processing. Dynamic allocation in real-time means that the allocation of resources, such as memory bandwidth and the native processors 216 of the memory appliance 224 may be adjusted while a computing job is executing. In batch processing, the resource allocation may be adjusted during the intervals between executions of the same computing job.

In examples, a job manager 302 may be software that executes on a management plane, such as the management plane 218. The job manager 302 may collect job metrics 304 from the processors used in a computing job, such as the legacy processors 210 and the native processors 216. In one example, the job metrics 304 may indicate the amount of parallelism that is taking place in all the computing jobs running on the datacenter 200. The job metrics 304 may show how much overlap is taking place between the legacy processors 210, and between the legacy processors 210 and native processors 216 of each computing job. The indication of overlap, or lack thereof, may be useful for determining how to improve the efficiency of each computing job, and the datacenter 200 itself. The number of useful processor instructions executed per cycle may also be an indicator of overlap, and an indicator as to whether the processors are stalling.

In one example, a computing job may be run on the datacenter 200 using local resources. Local resources may be computing resources, such as memory, that are physically proximate to the processor, and as such, have lower latency and faster response times than resources attached more remotely. Running a computing job in this manner may provide job metrics 304 that represent an efficient execution of the computing job. Accordingly, such job metrics 304 may be used to determine whether the computing job's actual performance may be improved with additional memory bandwidth or additional native processors 216.

As stated previously, in order to gain efficiency, the collective memory operations of computing jobs that are executed on the native processors 216 may be performed in parallel with other computing operations that are executed on the legacy processors 210. In examples, efficiency may be improved by providing more of the native processors 216 or by increasing the amount of memory bandwidth allocated for the computing job. Thus, a resource controller 306 may analyze the job metrics 304 for each of the computing jobs to determine whether to create new resource allocations 308. New resource allocations 308 may represent changes in the allocation of legacy processors 210, native processors 216, and memory bandwidth for any of the computing jobs running on the datacenter 200.

In one example, the resource controller 306 may determine whether to create the new resource allocation 308 based on a measure of processor utilization. In one example, a processor utilization score may be determined by using Equation 1:

$$Util = \frac{T_{comp}}{\max(T_{comp}, T_{coll})} \qquad \text{EQUATION 1}$$

In Equation 1, $T_{comp}$ represents the processing time of the computing operations that are executed on the legacy processors 210. Additionally, $T_{coll}$ represents the processing time of the collective memory operations that are executed on the native processors 216. In one example, a new resource allocation 308 may be created unless the value of the utilization score, according to Equation 1, is within a predetermined percentage of the value, one. For some computing jobs, such as batch processing that repeatedly processes the same input data, the processing time for the computing operations may approach a constant value. Thus, the value of the utilization score according to Equation 1 may be affected by the processing time of the collective memory operations. The processing time of the collective memory operations may depend on factors such as, the size of the data operated on by the collective memory operations, the way the collective memory operations are executed by the memory appliance 224, and the resources assigned to execute the collective memory operations, e.g., the number of native processors 216 and the memory bandwidth. However, it may not be possible to change the size of the data and the way that the collective memory operations are executed. Thus, increasing the number of native processors 216 to execute the collective memory operations may reduce the processing time for these operations, and increase the utilization score.

For batch processing computing jobs, a new resource allocation 308 may be generated after every execution to converge the utilization score towards a predetermined reference value. The predetermined reference value may represent an efficient execution of the batch processing computing job. Equation 2 represents another example way to generate a utilization score.

$$Util = \frac{T_{comp}}{T_{comm}}.$$ EQUATION 2

In one example, a feedback controller may be used to determine the new resource allocation 308 for native processors 216. Various feedback controllers may be used, such as, proportional, integral, or derivative feedback controllers. Equation 3 represents an example integral feedback controller where the tracking error, i.e., the difference between the utilization score and the predetermined reference value may determine how many native processors 216 may be added or removed in the new resource allocation 308.

$$N_{NAT}(k+1)=N_{NAT}(k)+K_I(Util_{ref}-Util(k)).$$ EQUATION 3

In Equation 3, $N_{NAT}$ represents the number of native processors 216 allocated, k represents the last execution of the computing job, k+1 represents the next execution of the computing job, $K_I$ represents the change in allocation, and $Util_{ref}$ represents the predetermined utilization reference value. Thus, $N_{NAT}(k+1)$ represents the number of native processors 216 to allocate in the new resource allocation 308 for the next execution of a computing job. The change from the previous allocation is represented by $K_I$ and may be proportional to the error, i.e., the difference between the utilization score and the utilization reference value.

The new resource allocation 308 may be input to a resource allocator 310, which may configure the new resource allocation 308 online or offline. The resource allocator 310 may be software that allocates resources to the computing job, such as the scheduler 222. In an alternative example, the resource allocator 310 may be a task dispatcher using a set of pre-allocated resources. A task dispatcher is software that runs on the datacenter 200 that portions the tasks of a computing job onto different legacy processors 210 and native processors 216 so that the computing job can perform its work using the parallelism offered by the datacenter 200.

A similar approach may be used to determine changes to the number of legacy processors 210 in the new resource allocation 308. However, the resource allocation 308 for legacy processors 210 may be based, not on processor level metrics, but on computing job level metrics, i.e., completion time. In this way, a change in the allocation of legacy processors 210 to a computing job may be determined to achieve fairness for multiple computing jobs running in the datacenter 200.

Figure 4:
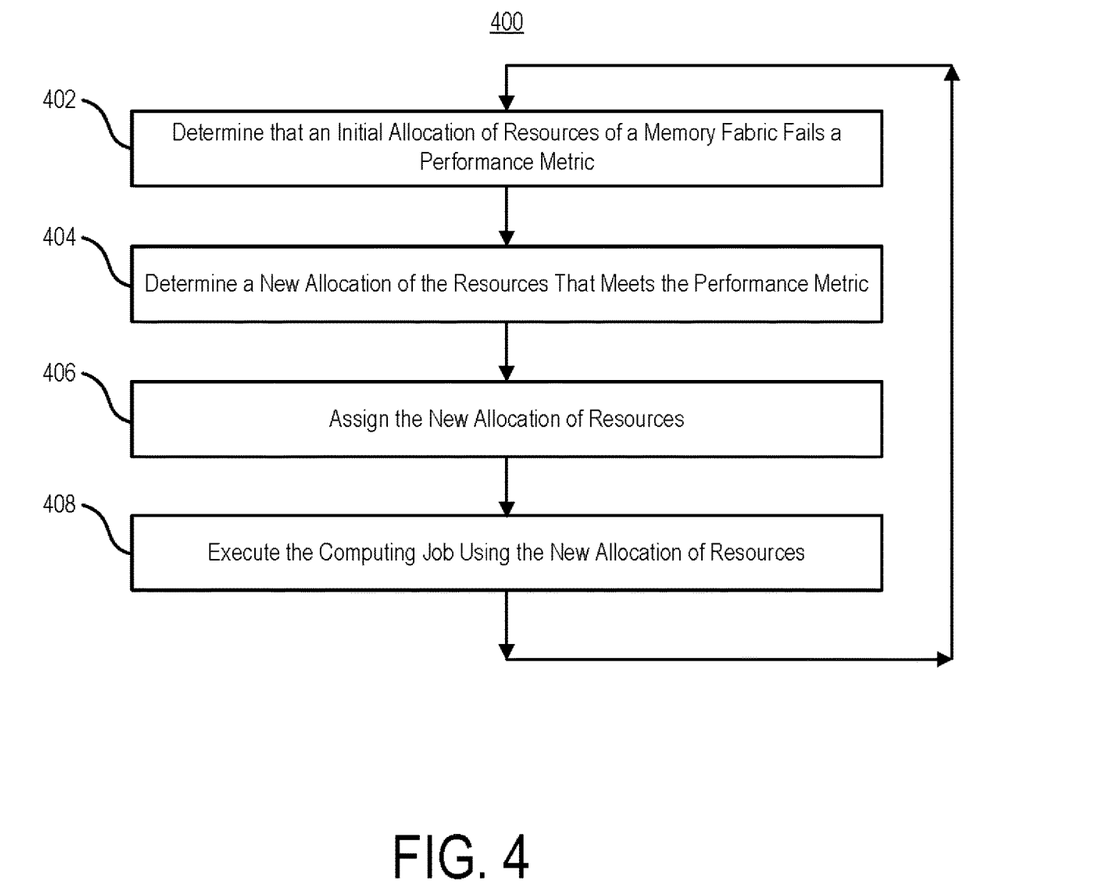
FIG. 4 is an example method for allocating resources of a memory fabric.

FIG. 4 is an example method for allocating resources of a memory fabric. The method is referred to by the reference number 400 and may be performed by a resource controller and a scheduler, such as the resource controller 306 described with reference to FIG. 3 and the scheduler 222 described with reference to FIG. 2. The method 400 may begin at block 402. At block 402, the resource controller 306 may determine that an initial allocation of resources of a memory fabric fails a performance metric for one or more computing jobs executing in the datacenter 200. The resources may include memory bandwidth across a memory fabric, and high memory bandwidth processors, such as native processors 216. In an example, the initial allocation of resources may fail the performance metric because the job metrics 304 indicate that the legacy processors 210 are stalling during execution of one or more computing jobs. Alternatively, the initial allocation of resources may fail the performance metric because the job metrics 304 may indicate that, within one or more computing jobs, there is a lack of overlap between the legacy processors 210 and native processors 216.

At block 404, the resource controller may determine a new allocation of resources for the computing job that meets the performance metric. In one example, the new allocation of resources may include a new allocation of memory bandwidth, e.g., an increase in the memory bandwidth allocation. Additionally, or alternatively, the new allocation of resources may include an increase in the allocation of native processors 216. The new allocation of memory bandwidth or native processors 216 may be based on achieving fairness for multiple computing jobs running in the datacenter 200. Accordingly, the increase in resources for the failing jobs may also mean a decrease in resources for computing jobs where the performance metric is being met. At block 406, the scheduler 222 may assign the new allocation of resources to the computing jobs.

At block 408, the scheduler 222 may execute the computing jobs using the new allocation of resources. Additionally, the method 400 may be performed repetitively on the datacenter 200. In one example, the datacenter 200 may run multiple iterations of the method 400 by performing periodic checks to determine whether the resources of the memory fabric are to be re-allocated. As such, control may flow from block 408 back to block 402.

It is to be understood that the process flow diagram of FIG. 4 is not intended to indicate that the method 400 is to include all the blocks shown in FIG. 4 in every case. Further, any number of additional blocks can be included within the method 400, depending on the details of the specific implementation. In addition, it is to be understood that the process flow diagram of FIG. 4 is not intended to indicate that the method 400 is only to proceed in the order indicated by the blocks shown in FIG. 4 in every case. For example, block 404 can be rearranged to occur before block 402.

Figure 5:
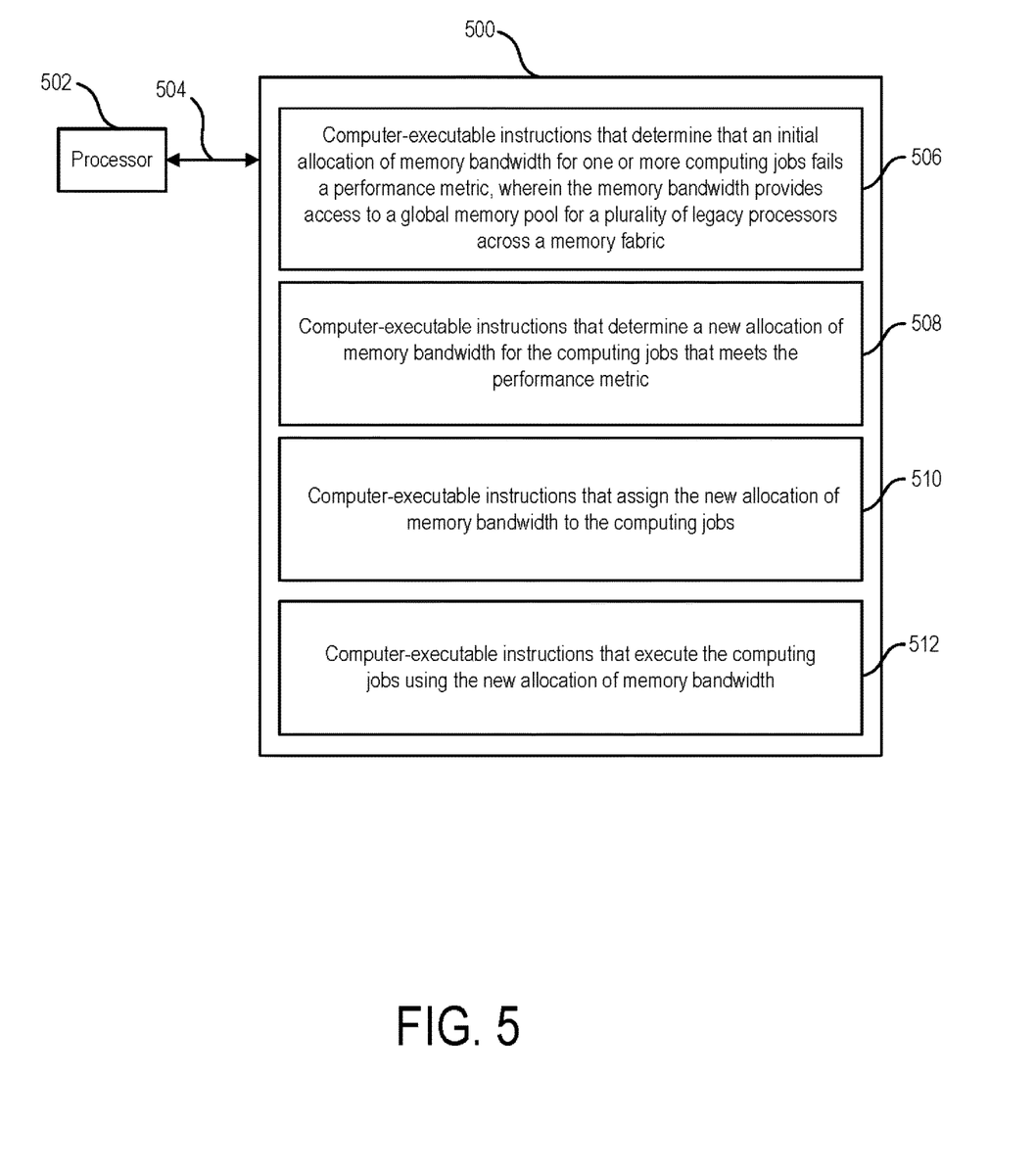
FIG. 5 is an example tangible, non-transitory computer-readable medium that stores code for allocating resources of a memory fabric.

FIG. 5 is an example tangible, non-transitory, computer-readable medium that stores code for allocating resources of a memory fabric. The tangible, non-transitory computer-readable medium is generally referred to by the reference number 500. The tangible, non-transitory computer-readable medium 500 may correspond to any typical computer memory that stores computer-implemented instructions, such as programming code or the like. For example, the tangible, non-transitory computer-readable medium 500 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 500 can be accessed by a processor 502 over a computer bus 504. A region 506 of the tangible, non-transitory computer-readable medium stores computer-executable instructions that determine that an initial allocation of memory bandwidth for one or more computing jobs fails a performance metric, wherein the memory bandwidth provides access to a global memory pool for a plurality of legacy processors across a memory fabric. A region 508 of the tangible, non-transitory computer-readable medium stores computer-executable instructions that determine a new allocation of memory bandwidth for the computing jobs that meets the performance metric. A region 510 of the tangible, non-transitory computer-readable medium stores computer-executable instructions that assign the new allocation of memory bandwidth to the computing jobs. A region 512 of the tangible, non-transitory computer-readable medium stores computer-executable instructions that execute the computing jobs using the new allocation of memory bandwidth.

Although shown as contiguous blocks, the software components can be stored in any order or configuration. For example, if the tangible, non-transitory computer-readable medium 500 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for allocating resources, comprising:
   determining that an initial allocation of memory bandwidth for one or more computing jobs fails a performance metric, including that an initial offloading allocation for the computing jobs fails an overlap metric, wherein the memory bandwidth provides access to a global memory pool for a plurality of legacy processors across a memory fabric;
   determining a new allocation of memory bandwidth for the computing jobs that meets the performance metric, including a new offloading allocation for the computing jobs that meets the overlap metric;
   assigning the new allocation of memory bandwidth, including the new offloading allocation, to the computing jobs; and
   executing the computing jobs using the new allocation of memory bandwidth, including the new offloading allocation.

2. The method of claim 1, wherein assigning the new allocation of memory bandwidth comprises changing a priority of one of the computing jobs.

3. The method of claim 1, wherein assigning the new allocation of memory bandwidth comprises configuring one or more switches of the memory fabric.

4. The method of claim 1, wherein executing the computing jobs using the new offloading allocation comprises offloading a plurality of collective memory operations from the legacy processors for the computing jobs to a plurality of native processors for the computing jobs.

5. The method of claim 4, wherein the native processors perform the collective memory operations for the computing jobs in parallel with a plurality of operations performed by the legacy processors for the computing jobs.

6. The method of claim 4, wherein offloading the collective memory operations comprises sending a request from the computing job to a memory appliance to perform the collective memory operations.

7. The method of claim 6, wherein the memory appliance comprises an application programming interface.

8. The method of claim 1, wherein the performance metric indicates that one of the computing jobs is stalling waiting for access to the memory fabric.

9. The method of claim 1, comprising determining the new offloading allocation based on a feedback control, wherein the feedback control is based on a utilization of the processors, a utilization of the high memory bandwidth processors, and a predetermined utilization reference.

10. The method of claim 1, wherein collective memory operations comprise computer instructions that move data across memory that is accessible to legacy processors and native processors.

11. The method of claim 1, wherein the new allocation of memory bandwidth is determined during execution of one of the computing jobs.

12. A system, comprising:
   a processor that executes stored instructions; and
   a memory device that stores instructions, the memory device comprising:
      computer-implemented code to determine that an initial allocation of memory bandwidth for one or more computing jobs fails a performance metric, wherein the memory bandwidth provides access to a global memory pool for a plurality of legacy processors across a memory fabric;
      computer-implemented code to determine a new allocation of memory bandwidth for the computing jobs that meets the performance metric;
      computer-implemented code to assign the new allocation of memory bandwidth to the computing jobs;
      computer-implemented code to determine that an initial offloading allocation for the computing jobs fails an overlap metric;
      computer-implemented code to determine a new offloading allocation for the computing jobs that meets the overlap metric;
      computer-implemented code to assign the new offloading allocation to the computing jobs; and
      computer-implemented code to execute the computing jobs using the new allocation of memory bandwidth, and the new offloading allocation.

13. The system of claim 12, wherein using the new offloading allocation comprises offloading a plurality of collective memory operations from the legacy processors for the computing jobs to a plurality of native processors for the computing jobs.

14. The system of claim 13, wherein offloading the collective memory operations comprises sending a request from the computing job to a memory appliance to perform the collective memory operations.

15. The system of claim 12, wherein the native processors perform the collective memory operations for the computing jobs in parallel with a plurality of operations performed by the legacy processors for the computing jobs.

16. The system of claim 12, wherein assigning the new allocation of memory bandwidth comprises one of:
   changing a priority of one of the computing jobs; or
   configuring one or more switches of the memory fabric.

17. The system of claim 12, wherein the performance metric indicates that one of the computing jobs is stalling waiting for access to the memory fabric.

18. A non-transitory, computer-readable medium storing computer-executable instructions, which when executed, cause a computer to:
   determine that an initial allocation of memory bandwidth for one or more computing jobs fails a performance metric, wherein the memory bandwidth provides access to a global memory pool for a plurality of legacy processors across a memory fabric;
   determine a new allocation of memory bandwidth for the computing jobs that meets the performance metric;
   assign the new allocation of memory bandwidth to the computing jobs;
   determine that an initial offloading allocation for the computing jobs fails an overlap metric;
   determine a new offloading allocation for the computing jobs that meets the overlap metric;
   assign the new offloading allocation to the computing jobs; and
   execute the computing jobs using the new allocation of memory bandwidth and the new offloading allocation, wherein:
      using the new offloading allocation comprises offloading a plurality of collective memory operations from the legacy processors for the computing jobs to a plurality of native processors for the computing jobs; and
      offloading the collective memory operations comprises sending a request from the computing job to a memory appliance to perform the collective memory operations.

19. The non-transitory, computer-readable medium of claim 18, wherein the performance metric indicates that one of the computing jobs is stalling waiting for access to the memory fabric.

\* \* \* \* \*